G. O. EBERHARDT.
POTATO HARVESTER.
APPLICATION FILED JULY 10, 1917.
1,303,180.
Patented May 6, 1919.
3 SHEETS—SHEET 1.
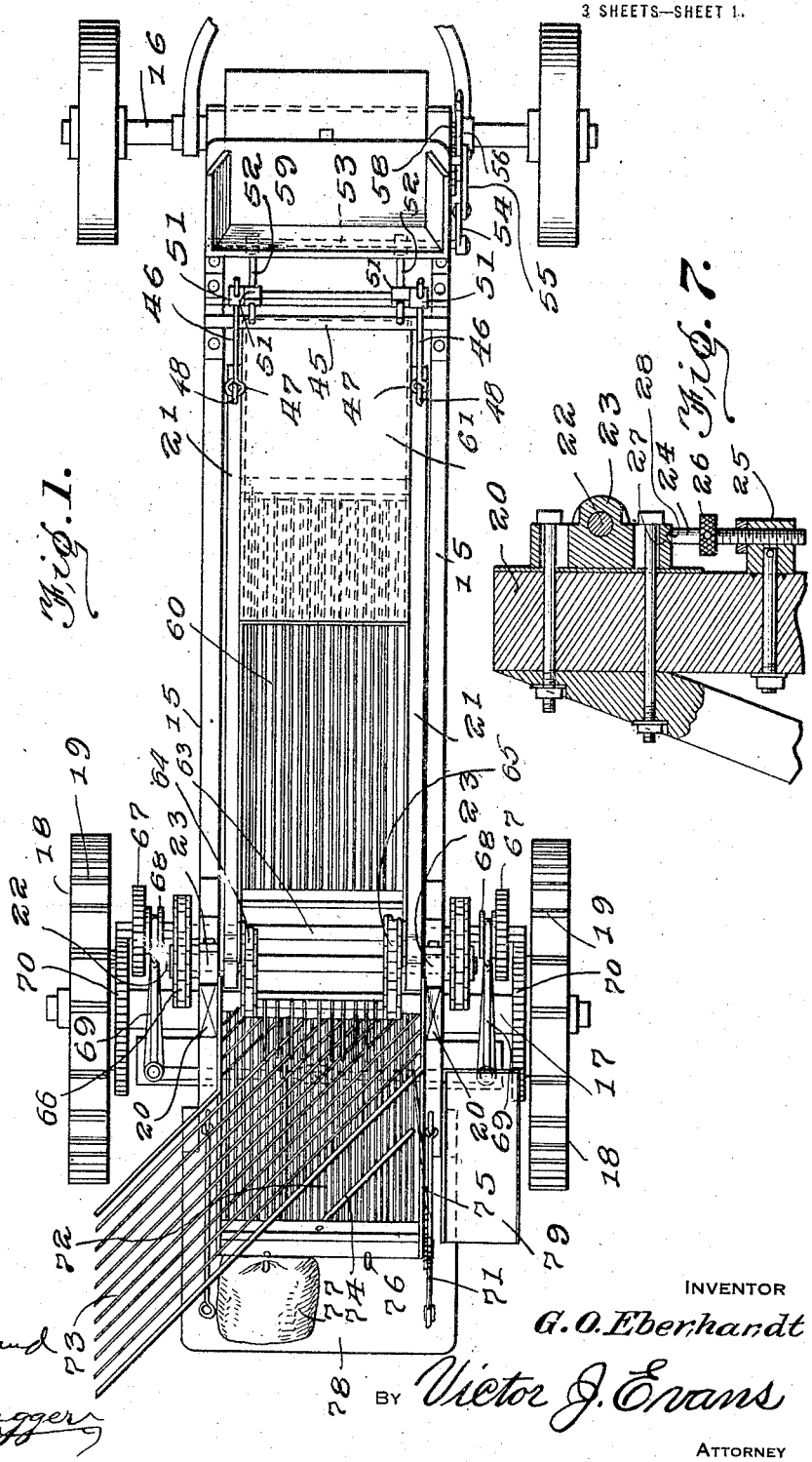
WITNESSES
H. N. Lybrand
Wm. J. Bagger
INVENTOR
G. O. Eberhardt
BY Victor J. Evans
ATTORNEY G. O. EBERHARDT.
POTATO HARVESTER.
APPLICATION FILED JULY 10, 1917.
1,303,180.
Patented May 6, 1919.
3 SHEETS—SHEET 2.
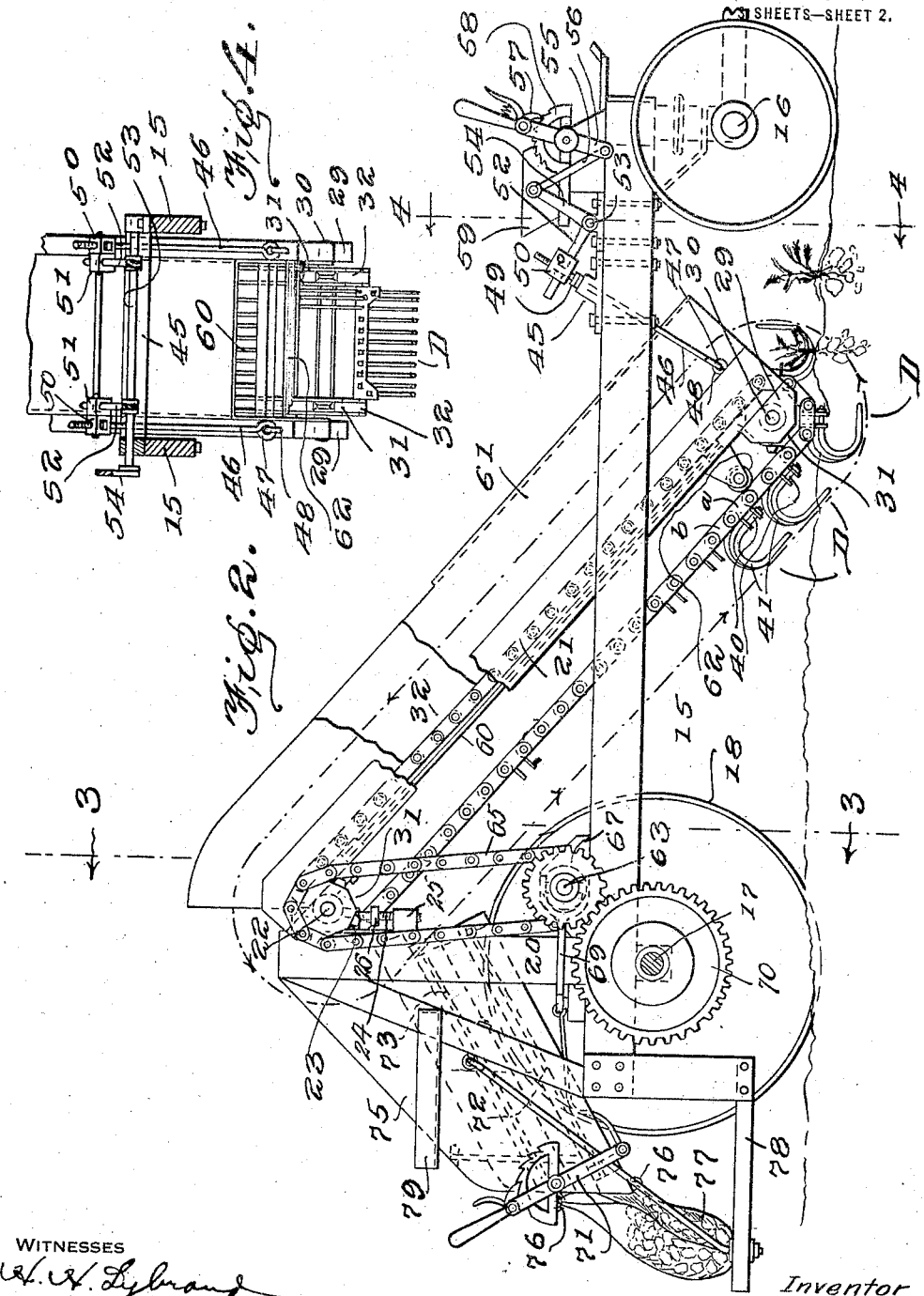
WITNESSES
Inventor
G. O. Eberhardt
BY
Victor J. Evans
Attorney G. O. EBERHARDT.
POTATO HARVESTER.
APPLICATION FILED JULY 10, 1917.
1,303,180.
Patented May 6, 1919.
3 SHEETS—SHEET 3.
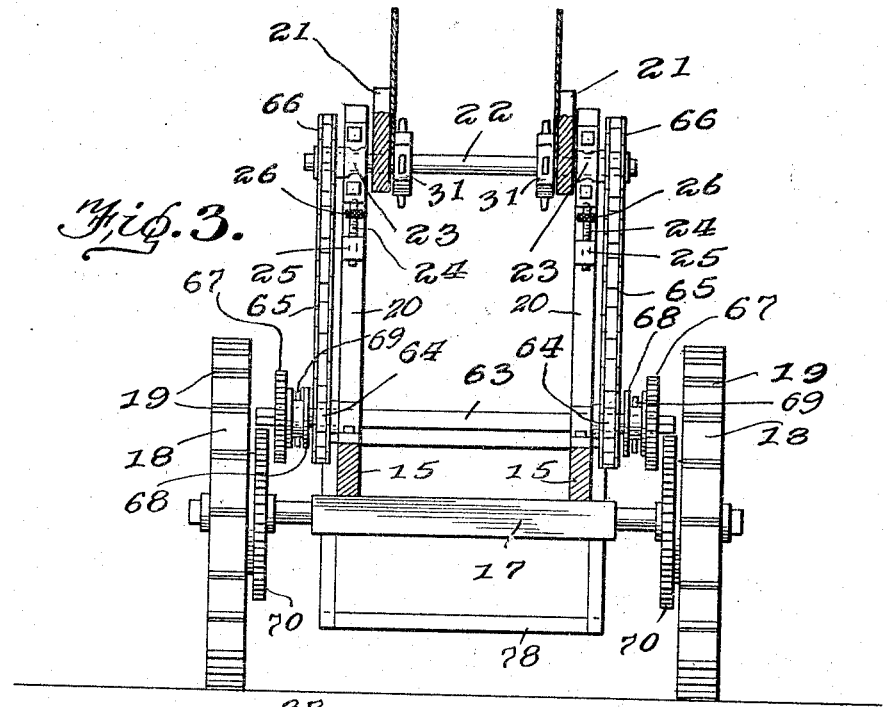
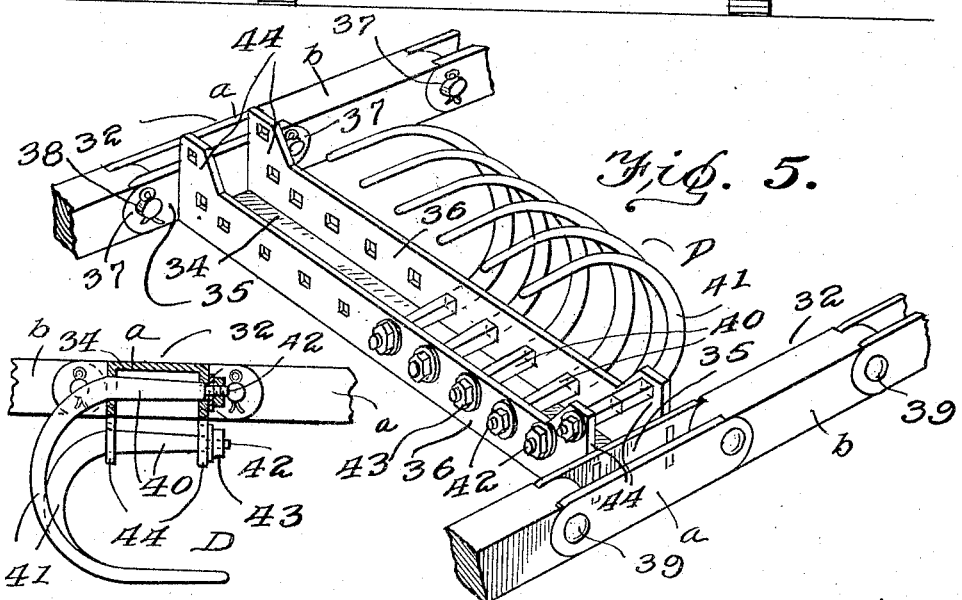
WITNESSES
INVENTOR
G. O. Eberhardt
BY Victor J. Evans
ATTORNEY

UNITED STATES PATENT OFFICE.

GEORGE O. EBERHARDT, OF BATTLERIVER, MINNESOTA, ASSIGNOR OF ONE-HALF TO JOSEPH JEROME, OF BATTLERIVER, MINNESOTA.

POTATO-HARVESTER.

1,303,180.  Specification of Letters Patent.  Patented May 6, 1919.

Application filed July 10, 1917. Serial No. 179,738.

*To all whom it may concern:*

Be it known that I, GEORGE O. EBERHARDT, a citizen of the United States, residing at Battleriver, in the county of Beltrami and State of Minnesota, have invented new and useful Improvements in Potato-Harvesters, of which the following is a specification.

This invention relates to potato harvesters, and has for its object to produce a machine of simple and improved construction whereby potatoes will be dug from the ground by means of forks attached to an endless conveyer, the latter serving also to elevate the potatoes and to dump them on a screen whereby adhering dirt will be detached and the potatoes conveyed to a receptacle, in this case consisting of a bag supported in a convenient position.

A further object of the invention is to simplify and improve the construction and operation of the combined digger and elevator, and especially of the ground engaging forks or diggers.

A further object of the invention is to produce simple and improved means for properly adjusting the elevating conveyer to insure a proper depth of penetration into the ground of the forks or digging elements.

A further object of the invention is to provide for the separation of the potatoes from dirt and vines.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

In the drawing,—

Figure 1 is a top plan view of the machine constructed in accordance with the invention.

Fig. 2 is a side elevation partly in section.

Fig. 3 is a transverse sectional view taken on the line 3—3 in Fig. 2.

Fig. 4 is a sectional detail view taken on the line 4—4 in Fig. 2.

Fig. 5 is a perspective detail view of a portion of the conveyer chain showing one of the digging elements.

Fig. 6 is a sectional detail view of the digging element.

Fig. 7 is an enlarged fragmentary section illustrative of an adjustment hereinafter specifically referred to.

Corresponding parts in the several figures are denoted by like characters of reference.

The frame 15 of the improved machine is mounted on wheels carrying front and rear axles 16, 17, the front axle being supported for swinging movement in a horizontal plane in order that the machine may be steered properly. The hind wheels 18 are provided with earth engaging grouts 19 to prevent slipping in operation.

The frame of the machine is provided near its rearward end with uprights 20 between which the conveyer frame 21 is swingingly supported on a shaft 22 for which bearing boxes 23 are provided, said boxes being slidably connected with the elevator frame, each box being engaged by a tightening screw 24 which is in threaded engagement with a nut 25 mounted on the conveyer frame, and each of said tightening screws being provided with a wrench seat 26 to enable it to be conveniently adjusted. Each of the boxes 23 has a conical socket 27 to receive the cone-shaped end or point 28 of the tightening screw. Similar tightening devices may be employed wherever desired on the improved machine.

The conveyer frame is provided near its lower end with bearings 29 for a shaft 30. Each of the shafts 22 and 30 carries a pair of sprockets 31 over which chains 32 are trained. The sprockets herein shown are of octagonal shape, each sprocket having four sides provided with teeth engaged by the open chain links, the solid chain links being adapted for engagement with the untoothed faces of the sprockets. The chains, as will be best seen in Fig. 5, are constructed with alternate open and solid links designated respectively by *a* and *b*.

Carried by the chains at suitable intervals are digging elements D each of which consists of a plate 34 having upturned flanges 35 at the sides thereof and upturned flanges 36 at its front and rear edges. The flanges 35 are of such a length as to form lugs 37 projecting beyond the front and rear flanges, said lugs being provided with apertures 38 for the reception of pins or pivot members 39 whereby they are connected with the respective chains, it being understood that each of the flanges 35 may constitute a part or member of one of the open chain links $a$. The flanges 36 are adapted for connection with the shanks 40 of the tines or fork members 41, said shanks being of rectangular, preferably square cross section, and made tapering longitudinally as best seen in Fig. 6. The shanks are provided, each, with a reduced screw threaded extension 42 for reception of a nut 43, by tightening which the tapered shank may be drawn tightly in engagement with the flanges 36. The tines 41 are of suitable arcuate form, and are blunt or rounded at their respective ends to avert spearing any potatoes that may lie in the path thereof.

It will be observed that the front and rear flanges 36 are provided with upstanding projections 44 adjacent to the side flanges 35, the fork members adjacent to the side members 35 are mounted in these projections, and will thus be spaced or offset outwardly with respect to the remaining fork members, thus producing a construction whereby the shanks of said outermost fork members will constitute guards that will prevent potatoes from rolling and being lost off the respective diggers.

For the purpose of effecting adjustment of the conveyer having the diggers with respect to the ground for convenience when the machine is to be transported from place to place, and also to insure the desired degree of penetration into the ground of the diggers when the machine is in operation, mechanism is provided which will now be described.

Mounted on the main frame near the forward end thereof is a cross bar 45 through which inclined or obliquely disposed rods 46 are guided, the lower ends of said rods being provided with eyes 47 which are loosely engaged with other eyes 48 on the conveyer frame. The upper end portions of the rods 46 are screw threaded as shown and are provided with limiting nuts 49 which, by engagement with the cross bar 45, will limit the movement of the rods 46 in a downward direction, thus regulating the extent to which the conveyer frame may be lowered and consequently regulating the degree of penetration of the diggers into the ground, the nuts 49 being obviously adjustable with this end in view. Near the upper ends the rods 46 are provided with nuts 50 having lugs or keepers 51 through which are guided arms 52 extending from a rock shaft 53 journaled on the main frame of the machine. The rock shaft 53 has a crank 54 which is connected by a link 55 with one arm of a hand lever 56 the other arm of which is provided with a stop member or locking device 57 engaging a rack segment 58 whereby the parts may be locked in adjusted position. The hand lever or adjusting lever 56 is arranged in convenient proximity to the driver for whom a seat 59 is provided.

The conveyer frame 21 is provided with longitudinally disposed rods 60 over which the diggers are guided to prevent sagging and also to prevent loss of potatoes. The conveyer frame is also partly inclosed by a housing 61 which will prevent loss of the potatoes and which will also constitute a safe guard. Near its lower end the conveyer frame is provided with a tensioning roller 62 which, by bearing against the lower flight of the conveyer, serves to press the diggers in a downward direction, thus insuring proper penetration and efficiency in operation.

Supported near the rearward end of the main frame is a countershaft 63 carrying sprocket wheels 64 which are connected by chains 65 with sprocket wheels 66 on the shaft 22 at the upper end of the conveyer frame over which the conveyer is trained and to which rotation will thus be imparted when the countershaft is being rotated. The countershaft 63 is provided with pinions 67 which are slidably mounted thereon for rotation therewith, each of said pinions having an annularly grooved collar 68 engaged by a shipping lever 69 whereby the respective pinions may be moved lengthwise of the countershaft to place them in or out of engagement with spur wheels 70 that are mounted upon or connected with the ground wheels 18. The shipping levers 69 are suitably connected with and adapted to be simultaneously actuated by a hand lever 71. It will be seen that by this simple mechanism motion may be transmitted to the conveyer when the machine is in operation and that such motion may be interrupted at any time when desired.

Supported on the frame of the machine is an inclined screen 72 formed of longitudinal rods which are placed close enough together to prevent potatoes of marketable size from passing therebetween while dirt and impurities will escape on the ground. Supported above the screen 72 and extending diametrically with respect thereto, so as to discharge at one side of the machine, is another much coarser screen which I call the vine separator 73 and which directly receives material discharged over the conveyer. The potatoes will drop through the screen or vine separator 73 while the vines will be discharged over said screen at one side of the machine.

Supported at the lower end of the screen 72 is a gate 74, said gate being supported midway between the sides of the screen and extending in an upward direction so as to be capable of being placed in engagement with the side wall 75 of the screen at either side thereof, thus directing the potatoes passing over the screen in the direction of the other side wall. Hooks or supporting members 76 are provided whereby a bag 77 may be supported adjacent to either side of the screen so as to receive the potatoes discharged thereover. When one bag has been filled the position of the gate may be shifted, a second bag having meanwhile been placed in position. This work is done by an operator for whom a stand 78 is provided at the tail end of the machine. A bracket or rack 79 is also mounted in a suitable position to support empty bags.

From the foregoing description, taken in connection with the drawings, hereto annexed, the operation and advantages of this invention will be readily understood. When the machine is drawn over the ground, astride a row of potatoes, motion may be transmitted from the ground wheels to the conveyer, the diggers of which will engage the ground, extricate the potatoes and carry the latter to the vine separator through which the potatoes will escape to the screen 72 over which they will be discharged into the bags provided for the purpose. The construction of the machine is simple and inexpensive and it will be found to be thoroughly efficient for the purpose for which it is provided.

I claim:—

1. In a machine of the class described, the combination with an endless conveyer comprising two chains and supporting and guiding means for the same, of a digging element comprising a plate having upturned flanges provided with apertures and fork elements having shanks extending through and securely connected with the apertured flanges.

2. In a machine of the class described, the combination with an endless conveyer comprising two chains and supporting and guiding means for the same, of a digging element comprising a plate having upturned flanges provided with apertures and fork elements having shanks extending through and securely connected with the apertured flanges, said shanks being of non-circular cross section and said apertures being correspondingly shaped to prevent the shanks from turning therein.

3. In a machine of the class described, the combination with an endless conveyer, of a digging element consisting of a plate having upturned edges provided with apertures, a fork element having a tapered shank engaging the apertures, said shank being provided with a reduced threaded end portion, and a nut engaging said end portion and drawing the tapered shank tightly in engagement with the apertured flanges.

4. In a machine of the class described, the combination with an endless conveyer, of a digging element consisting of a plate having upturned edges provided with apertures, a fork element having a tapered shank engaging the apertures, said shank being provided with a reduced threaded end portion, and a nut engaging said end portion and drawing the tapered shank tightly in engagement with the apertured flanges, said shank being of non-circular cross section and the apertures being correspondingly shaped to prevent the shank from turning therein.

5. In a machine of the class described, the combination with a pair of guided and supported driven chains, each consisting of solid and open links arranged in alternate order, each open link comprising outer and inner members, in combination with a digging element consisting of a plate having upturned flanges at the sides and at the front and rear edges thereof, said side flanges projecting beyond the front and rear flanges, and fork elements having shanks extending through and fixed in the front and rear flanges, and pivot members whereby the side flanges are connected with solid links of the respective chains.

In testimony whereof I affix my signature.

GEORGE O. EBERHARDT.